April 22, 1958 — M. H. MEEKINS ET AL — 2,831,399
DUD JETTISONING DEVICE FOR ROCKET LAUNCHER
Filed March 1, 1954 — 7 Sheets-Sheet 1

INVENTORS
MARVIN H. MEEKINS
MAURICE H. BALLER
CHARLES A. JOHNSTONE

BY
ATTORNEYS

April 22, 1958 M. H. MEEKINS ET AL 2,831,399
DUD JETTISONING DEVICE FOR ROCKET LAUNCHER
Filed March 1, 1954 7 Sheets-Sheet 2
FIG. 2
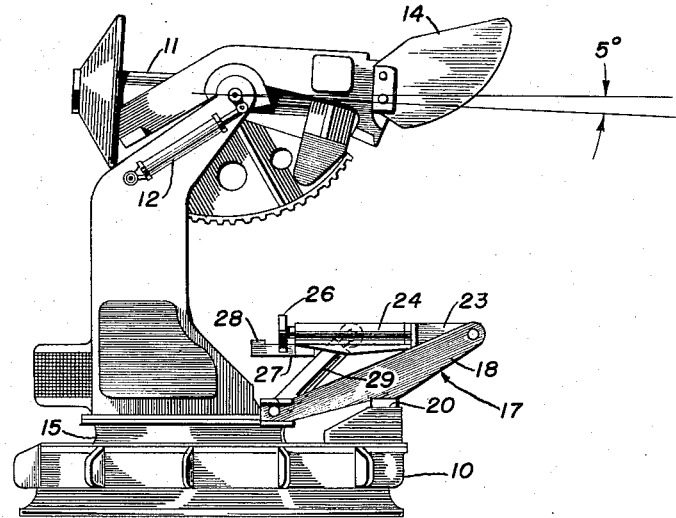
FIG. 5
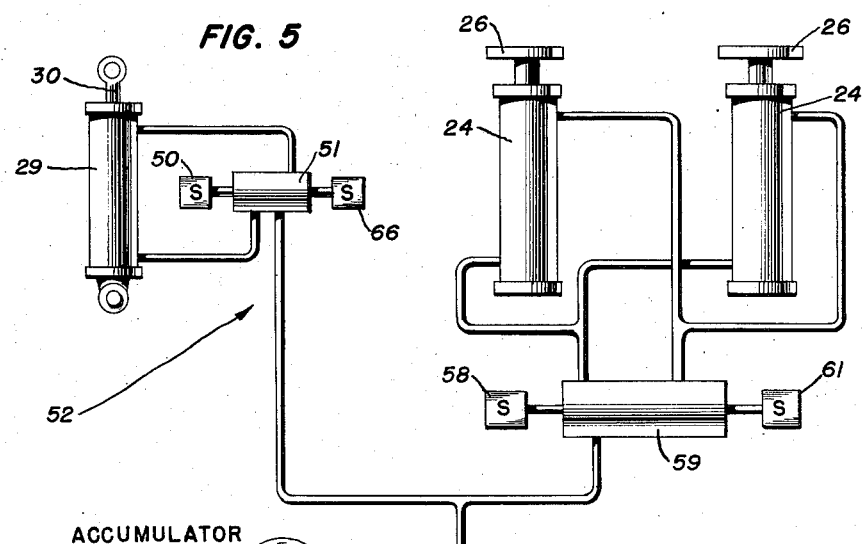
INVENTORS
MARVIN H. MEEKINS
MAURICE H. BALLER
CHARLES A. JOHNSTONE
BY 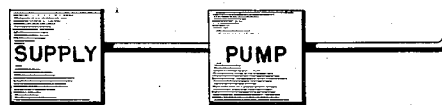
ATTORNEYS April 22, 1958　　M. H. MEEKINS ET AL　　2,831,399
DUD JETTISONING DEVICE FOR ROCKET LAUNCHER
Filed March 1, 1954　　　　　　　　　　7 Sheets-Sheet 3
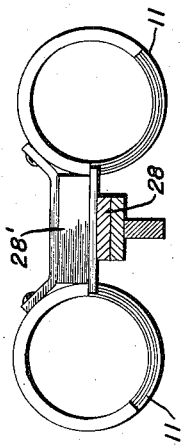
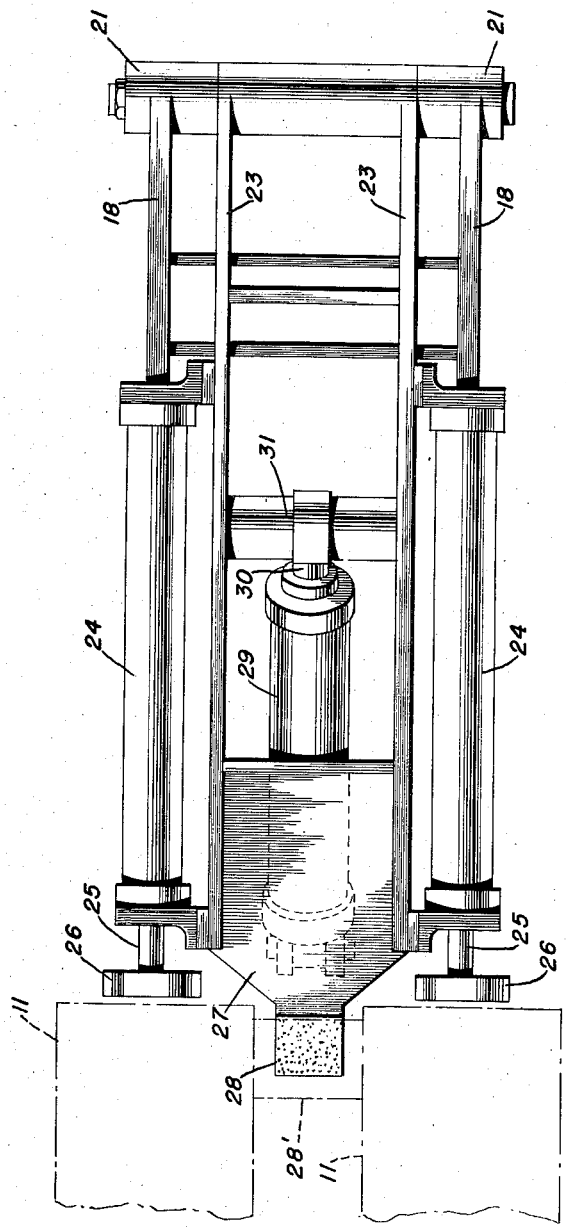
INVENTORS
MARVIN H. MEEKINS
MAURICE H. BALLER
CHARLES A. JOHNSTONE
BY
ATTORNEYS

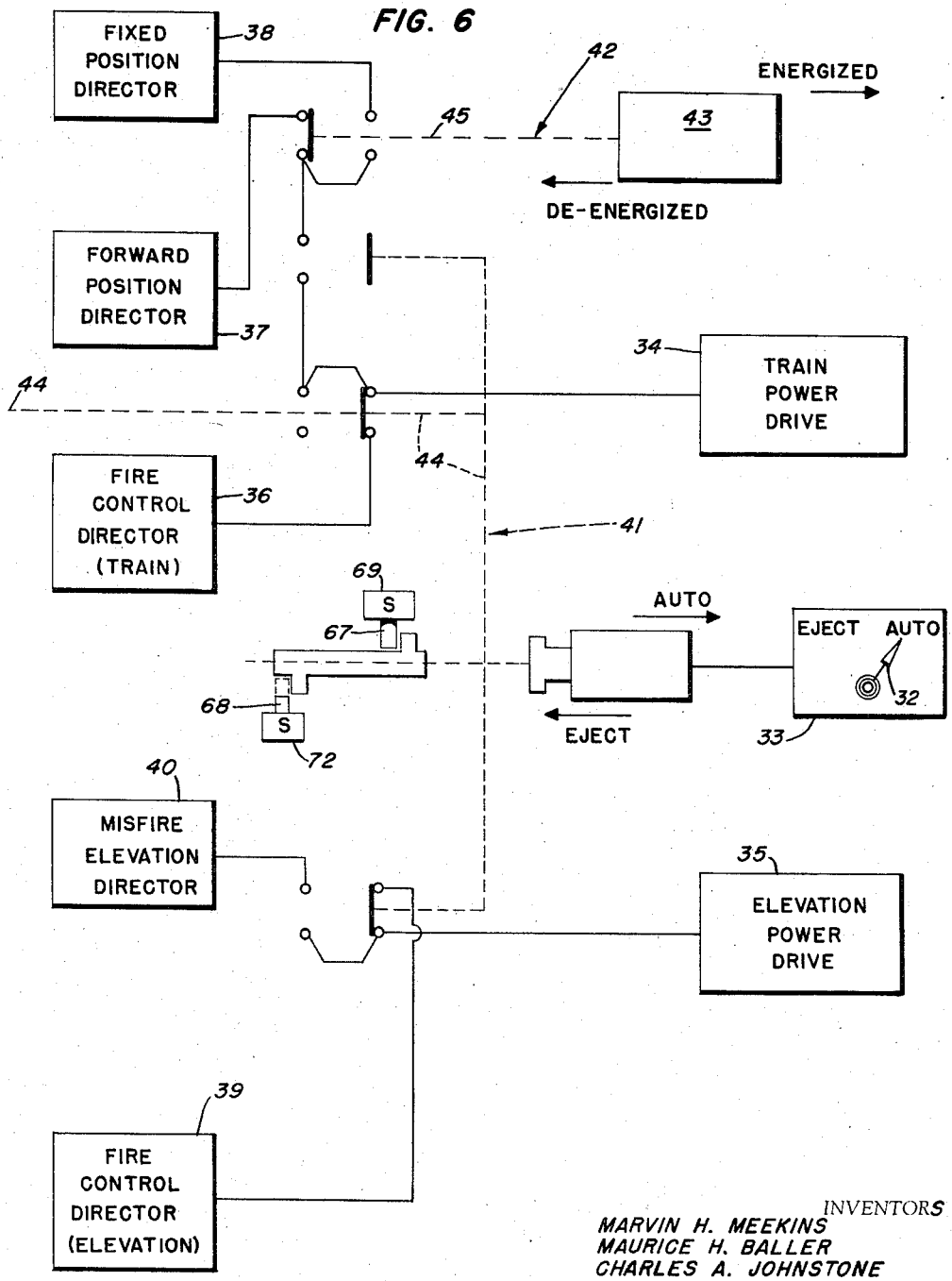

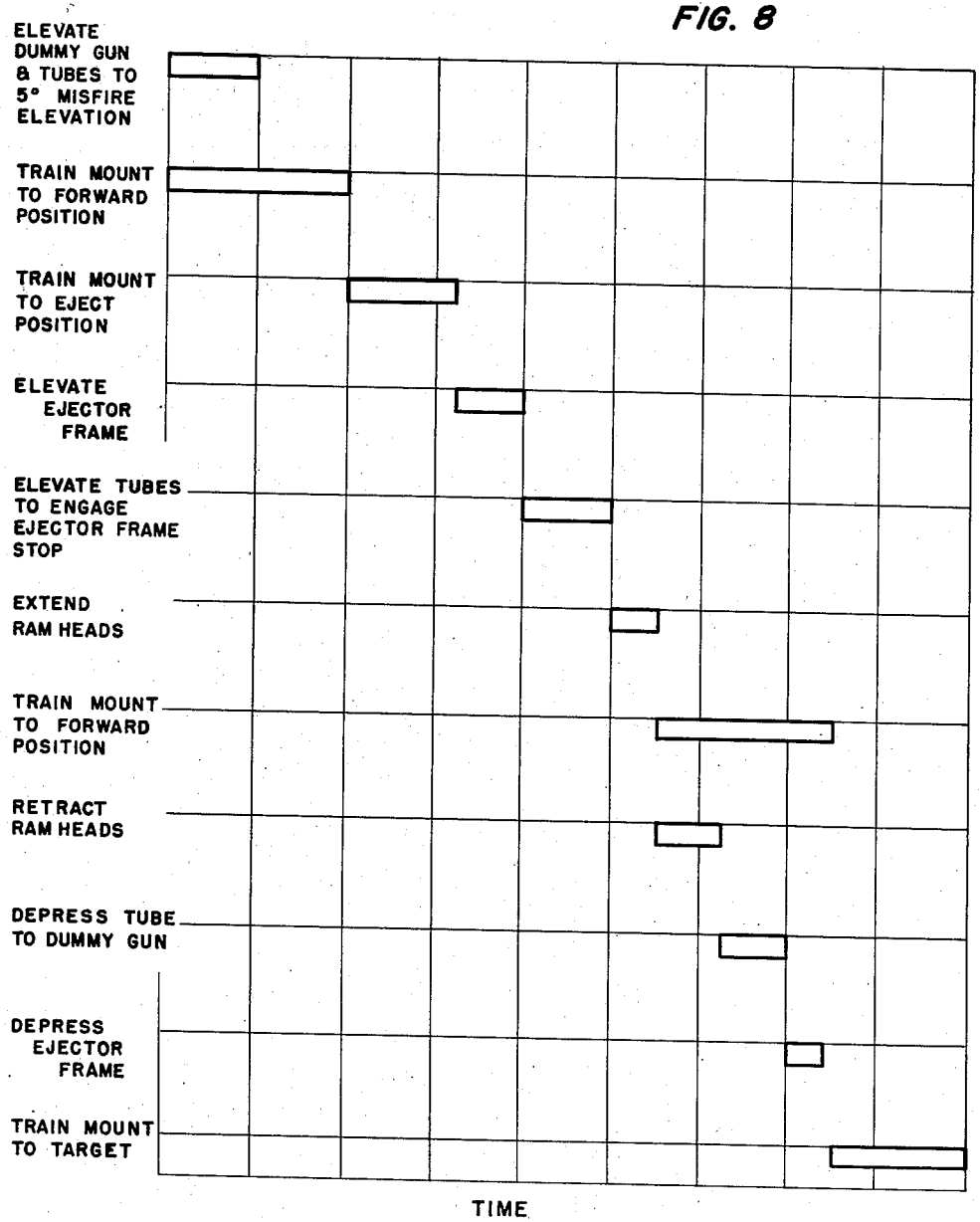

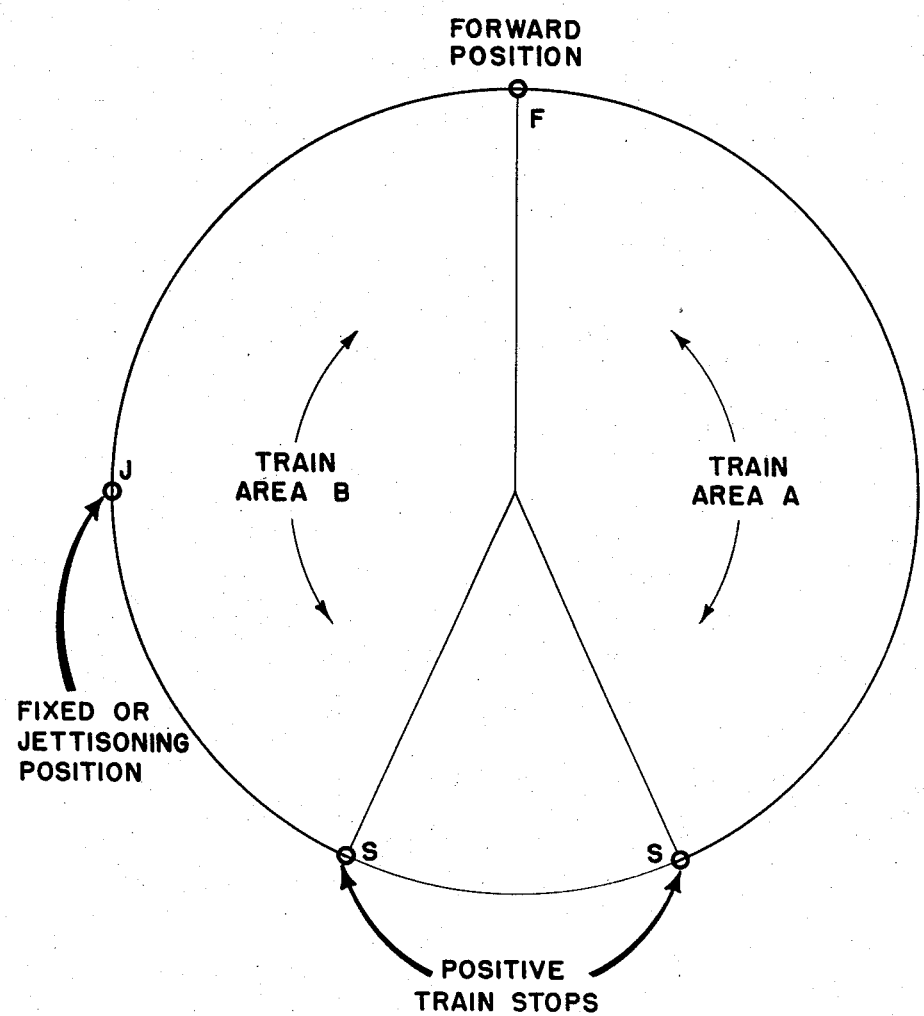

United States Patent Office 2,831,399
Patented Apr. 22, 1958

2,831,399
DUD JETTISONING DEVICE FOR ROCKET LAUNCHER

Marvin H. Meekins, Falls Church, Va., Maurice H. Baller, Washington, D. C., and Charles A. Johnstone, Indianapolis, Ind., assignors to the United States of America as represented by the Secretary of the Navy Application March 1, 1954, Serial No. 413,486

7 Claims. (Cl. 89—1.7)

(Granted under Title 35, U. S. Code (1952), sec. 266)

The invention described herein may be manufactured and used by or for the Government of the United States of America for governmental purposes without the payment of any royalties thereon or therefor.

This invention relates to a dud jettisoning device and controls therefor and more particularly to a dud ejecting mechanism for use with an automatic rocket launcher of the type comprising one or more rocket guide tubes which oscillate between an inclined firing position and a vertical loading position in which latter position the tubes are in alignment with hoist means which supply ammunition to the guide tubes.

During the operation of a rocket launcher of the type to which this invention relates misfires occasionally occur with the result that a rocket remains in one of the rocket guide tubes after the firing switch has been actuated, and in such cases the operation of the launcher must be suspended until the rocket is removed from the tube. Heretofore it has been necessary, on such occurrences, for the launcher operator either to wait for the rocket to be expelled under its own force, since it occasionally happens, for one reason or another, that the rocket propellant is not ignited immediately upon the actuation of the firing switch, or to obtain volunteers to manually eject the rocket, which latter step can be taken only after numerous safety precautions are observed such for example as the flowing of water through the tubes for a period of time. Further in such previous launching arrangements, the mount, when caused to swing to the fixed or jettisoning position whereat the dud could be ejected overboard, would ordinarily automatically, because of the control circuits which normally control the launcher, attempt to train to such fixed position by swinging through the shortest arc. In some cases such movement through the shortest arc would necessitate movement through positive train stops which are provided on shipboard installations to prevent damage to the vessel's superstructure.

The disadvantages of these prior dud removal systems are manifest. A prime disadvantage lies in the time loss involved in the launcher being incapacitated for service during the presence of a dud in one of the guide tubes, and further disadvantages reside in the time loss involved in the manual removal of the dud and the possibility of injury to the dud removal crew due to the ignition of the rocket propellant during the removal operation. In addition, the time and difficulties involved in training the mount by power to the fixed jettisoning position in those cases where swinging through the shortest arc would involve passing through the positive train stops render such power training movement impractical. Manual training movement is of course extremely slow and dangerous.

Applicants have overcome the disadvantages of the prior arrangements by providing a remotely controlled, automatic, dud jettisoning device to be mounted on and trained with the launcher mount, whereby a dud missile may quickly be ejected from the launcher tube without the necessity of personnel exposing themselves to possible injury, and control means for preventing the mount from training through the train stops when swinging from target to jettisoning position or vice versa.

It is therefore an object of the present invention to provide a dud jettisoning mechanism for a missile launching device.

Another object of this invention is to provide a device for ejecting a dud from an automatic rocket launcher.

A further object of this invention is to provide a dud ejecting device for a rocket launcher of the type comprising rocket guide tubes which oscillate between firing positions and a vertical loading position.

Another object is to provide a device for quickly and safely ejecting a dud from a rocket launcher.

Another object of this invention is to provide a remotely controlled device for quickly removing a dud from a rocket launcher without the necessity of personnel entering the danger zone around the launcher.

Another object of this invention is to provide a dud jettisoning device to be mounted on and trained with a rocket launcher and automatically controlled to move from a stowed position, wherein the launcher may operate with complete efficiency, to a jettisoning position, wherein the dud is automatically ejected overboard.

Another object of this invention is to provide a dud ejecting device which may be completely automatic in its operation.

Another object is to provide a combination rocket launcher and dud jettisoning device which automatically moves from target position to ejecting position, ejects the dud, and trains back toward target position after the manual or automatic initiation of the ejecting cycle.

A further object of this invention is to provide a combination trainable rocket launcher and dud ejecting device which will automatically train from target position to ejecting position and return to target position without attempting to pass through the launcher positive train stops.

Other objects and many of the attendant advantages of this invention will be readily appreciated as the same becomes better understood by reference to the following detailed description when considered in connection with the accompanying drawings wherein:

Fig. 2 is a reduced side elevation of the launcher and jettisoning device with the rocket guide tubes and dummy gun shown at their 5° misfire elevation and the jettisoning mechanism shown in its stowed position;

Fig. 3 is an enlarged plan view from above of the present jettisoning device in its stowed position;

Fig. 4 is an enlarged view taken substantially along line 4—4 of Fig. 1 showing the rocket guide tube stop on the ejector frame engaging the rocket guide tube assembly in the jettisoning position;

Fig. 5 is a diagrammatic view of the hydraulic system of the present jettisoning device, only the supply lines being shown for the sake of clarity;

Fig. 6 is a diagrammatic view of a portion of the selective switching arrangement of the present invention to accomplish shifting from the automatic firing cycle to the eject cycle or vice versa;

Figure 7:
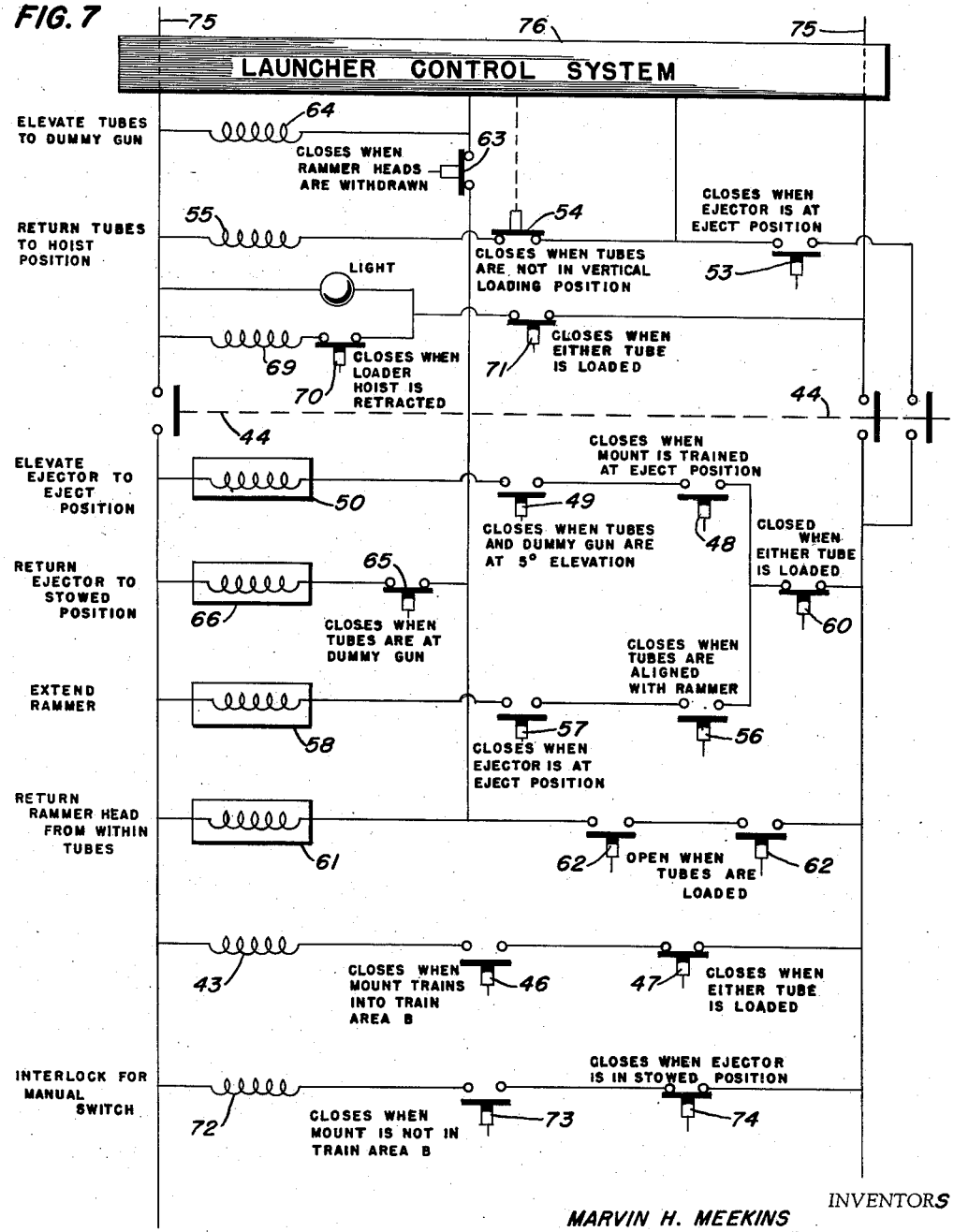

Fig. 7, to be considered in conjunction with Fig. 6, is a diagrammatic view of the remainder of the selective switching arrangement and the related control circuit to accomplish the automatic sequential operation of the jettisoning cycle;

Fig. 8 is a time cycle diagram of the jettisoning operation; and

Fig. 9 is a schematic view showing the train areas and location at positive train stops in a launcher incorporating the present jettisoning device.

The present invention is shown applied to a rocket launcher which includes generally a trainable mount 10 having pivotally mounted thereon, for movement in elevation, rocket guide tubes 11 which tubes may be caused to move in elevation by suitable means such as a hydraulic cylinder 12. Also pivotally mounted on the mount, for movement in elevation about the guide tube pivotal axis, is a dummy gun 13 having a blast deflector 14 secured to the after end thereof. The dummy gun and guide tubes are movable in elevation independently of each other, the former being continually under the control of an elevation computer director, which director may be the conventional signal generator and transmitter, while the latter oscillates, during the firing cycle, between a firing position, controlled by the dummy gun, and a vertical loading position. Included on the mount are a carriage 15 and a base member 16.

The jettisoning device of the present invention comprises bracket 17 including a pair of parallel arms 18 rigidly fixed to the carriage and base member as at 19 and 20 and having bearings 21 provided at their after ends. Pivotally supported on the bracket at said bearings is a frame 22 comprising parallel arms 23 to each of which, adjacent their forward ends, is secured a hydraulic rammer cylinder 24 in which moves a rammer or jettisoning piston 25 having a ram head 26 formed on the outer end thereof, which ram heads are adapted to be extended into the rocket guide tubes during the jettisoning cycle to eject a rocket therefrom. Joining said frame arms 23 at their forward ends is a bridge piece 27 rigidly supporting a rocket guide tube stop 28 to engage a brace 28' on the rocket guide tube assembly. A frame elevating hydraulic cylinder 29 is pivotally secured at one end to carriage 15 and receives a piston 30 pivotally attached at its free end to a brace 31 fixed at its opposite ends to frame arms 23.

Referring to the drawings and especially to Fig. 8, showing the sequence of operations during the jettisoning cycle, there will now be described one complete cycle of operation of the present jettisoning mechanism: At the initiation of the ejecting cycle, that is during the automatic firing cycle of the launcher, the rocket guide tubes will be in registry with the dummy gun as shown in Fig. 2, the latter being continually directed to target elevation by means to be later described, and the ejector frame 22 will be in its stowed position, also shown in Fig. 2.

Figure 1:
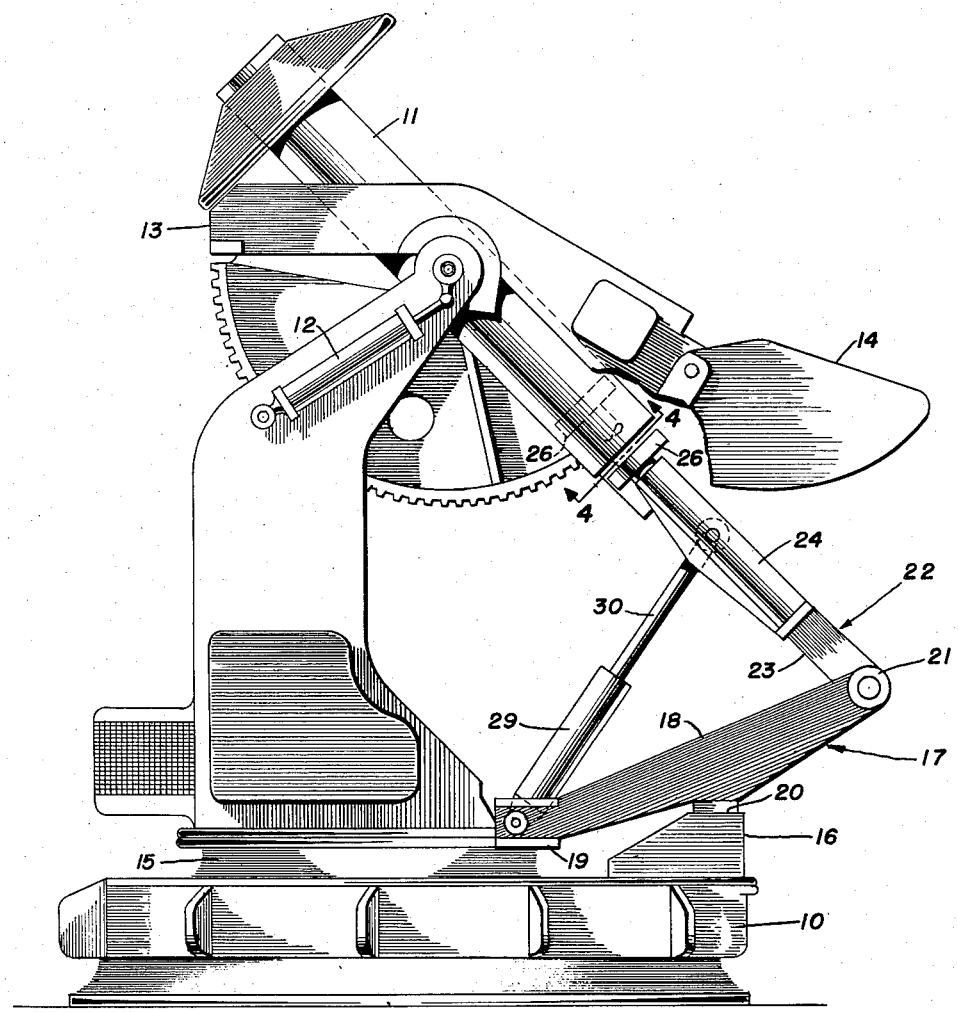
Fig. 1 is a side elevation of the launcher and jettisoning device with the rocket guide tubes and jettisoning device shown in jettisoning position.

In Fig. 9 is illustrated the entire training area of the mount and the relative position of positive train stops S which prevent the launcher from being directed toward some interfering structure. Point F of said training area, is designated as the forward position, and point J as the fixed or jettisoning position. The area of train to the right of forward position F being designated as train area A and the area of train to the left of the forward position being designated as train area B. Assuming that the launcher, at the time of misfire, is trained to train area A to the right of the forward position, a misfire switch 32, on a misfire control panel 33 (Fig. 6) will, upon the occurrence of a misfire, be either manually or automatically moved to the "eject" position from the automatic firing position to initiate the automatic ejecting cycle. This switch, misfire control panel, and the control system to effect the following sequential operations will be hereinafter more fully described. Upon movement of misfire switch 32 to the eject position, the dummy gun and rocket guide tubes are caused to elevate to a 5° misfire elevation as indicated in Fig. 2 and simultaneously the mount is caused to train first to the forward position F and then to the fixed or jettisoning position J. Upon reaching the jettisoning position, pressure fluid will be admitted to the ejecting frame elevating hydraulic cylinder 29 whereby to elevate the ejecting frame 22 to its jettisoning position shown in Fig. 1. The rocket guide tubes will now commence elevating to their vertical loading position but such movement will be interrupted upon the guide tube assembly brace 28' engaging the guide tube stop 28 on the frame 22. The guide tubes and rammer heads 26 will now be in registry as shown in Fig. 1, thus conditioning the system for the commencement of the ejecting operation. The dummy gun will, during the above-described movement of the rocket guide tubes, remain fixed at the 5° misfire elevation under the control of a dummy director, such as, for example, a signal generator, as will later be described. Ram heads 26 will now be extended into the tubes, as shown in dotted lines in Fig. 1, and, upon the ejection of the dud, will be retracted. Immediately upon the ejection of the dud, the mount is caused to train back toward the forward position F and upon the withdrawal of the ram heads from the guide tubes, the latter will again move into registry with the dummy gun 13. When the guide tubes are realigned with the dummy gun, the ejector frame 22 is depressed to its stowed position. Upon reaching the forward position F, the mount, which has been training forward during the movement of the frame to the stowed position, will stop and the return of the mount to target position and the launcher to automatic firing operation may be initiated by movement of switch 32, either manually or automatically, to the "automatic" position.

Should the mount, at the time of the misfire, be within train area B, the cycle of operation will be the same as described above with the exception that upon the movement of switch 32 to the "eject" position, the mount will train directly to the jettisoning position J without first training to the forward position F.

Reference is now made to Figs. 6 and 7 wherein there is illustrated the control means for effecting the above-described automatic jettisoning cycle. The launcher is driven in train by means of a train power drive 34 and the dummy gun is driven in elevation by means of an elevation power drive 35, such drive being responsive to the electrical signals transmitted from directors of the conventional control type. The rocket guide tubes are operated between firing and loading positions by means of hydraulic cylinder 12 in the launcher hydraulic operating system (not shown) as was previously mentioned. There are provided three directors which include train signal generators which transmit electrical signals to the power drive 34 for train control of the mount, namely the fire control computer director (train) 36, the forward position director 37 and the fixed or jettisoning position director 38, which are adapted, by means of the control circuit below described, to be selectively placed in circuit with the train power drive 34. The fire control computer director (train) 36 serves to train the lancher mount to the target position, the forward position director 37 serves to train the mount to the forward position F regardless of the train angle of the mount at the time said director becomes operative, and the fixed position director 38 serves to train the mount from the forward position to the fixed or jettisoning position J.

There are further provided two directors which include elevation signal generators which transmit electrical signals to the power drive 35 for elevation control of the dummy gun, namely a fire control computer director (elevation) 39 and a misfire elevation director 40, both of which are adapted, by means of the below-described control means, to be selectively placed in circuit with the elevation power drive 35. The fire control computer director (elevation) 39 serves to continually elevate the dummy gun 13, and hence the guide tubes, to target position, and the misfire elevation director 40 serves to elevate the dummy gun and guide tubes to the 5° misfire elevation.

A switching arrangement generally indicated as 41, actuated by switch 32 on a misfire control panel 33, and a switching arrangement 42 actuated by solenoid 43, to be hereinafter described, function to selectively couple the power drives and directors as set forth above. Switching arrangement 41 includes a contactor bar 44 carrying suitable contacts which, in the "automatic" position of switch 32, will be positioned as shown in Figs. 6 and 7 and which in the "eject" position of switch 32, will be moved to the left, as viewed in Figs. 6 and 7. Switching arrangement 42 includes a contactor bar 45 which, when solenoid 43 is de-energized, will be positioned as shown in Fig. 6, and which, when solenoid 43 is energized, will move to the right, as viewed in Fig. 6. A switch 46 (Fig. 7) in series with solenoid 43 is of the toggle type and is moved to the closed position when the mount trains from train area A into train area B (Fig. 9) and opens upon reverse training of the mount. Assuming at least one rocket or dud to be in the tubes and the launcher to be trained, at the time of misfire, within train area A, switch 46 will be in its open position, switch 47 (Fig. 7) in its closed position, solenoid 43 de-energized, and therefore contactor 45 in the position shown. The contacts associated with the contactor 45 will thus be conditioned to place the forward position director 37 in circuit with the train power drive 34 upon the movement of contactor bar 41 to its left-hand position by the operation of misfire switch 32 to the eject position. Upon the occurrence of a misfire, switch 32 is operated, either manually or automatically, as for example, by means of a delay circuit which is energized a predetermined period of time after the closing of the firing switch if the rocket remains in the tube, to the "eject" position, whereupon contactor bar 41 moves to its left-hand position, thereby placing the forward position director 37 in circuit with the train power drive 34, the misfire elevation director 40 in circuit with the elevation power drive 35 and simultaneously connecting the jettisoning cycle control system shown in Fig. 7 to a source 75 of operating current, which source also supplies the launcher control system generally indicated as 76. Under the control of said directors, the mount is caused to train toward the forward position F and simultaneously the dummy gun and tubes are caused to elevate to the 5° misfire elevation. Upon training to the forward position F, the mount will move switch 46 to its closed position, thereby energizing solenoid 43, shifting contactor 45 to the right, and thus shifting the launcher train control from the forward position director 37 to the fixed position director 38. The launcher now trains to fixed or jettisoning position J and stops, whereupon switch 48 is closed, and, since the tubes and dummy gun have by this time been elevated to the 5° misfire elevation, switch 49 will be closed and the energizing circuit for ejector frame elevating solenoid 50 will be completed. The latter actuates a control valve 51 in the ejector mechanism hydraulic system, generally indicated as 52 (Fig. 5), whereby to admit pressure fluid to the lower end of ejector frame elevating cylinder 29 and elevate the frame to the jettisoning position. (For the sake of clarity, only the supply lines for this hydraulic system are shown in Fig. 5.) Frame 22 upon reaching the jettisoning position, closes switch 53 (Fig. 7), and, since switch 54 will be closed owing to the fact that the tubes are not in their vertical loading position, the energizing circuit for the tube elevating solenoid 55 will be completed and the latter will actuate a control valve in the launcher hydraulic system (not shown) whereby to admit pressure fluid to one end of tube elevating cylinder 12 (Fig. 1) and cause said tubes to elevate toward their vertical loading position. Stop 28 (Fig. 3) on the ejector frame 22 will interrupt the movement of the tubes to their vertical loading position and the tubes will be held stationary in alignment with the rammer cylinders 24 on the elevated ejector frame as shown in Fig. 1. Upon reaching said stationary position, the tube assembly will move switch 56 to its closed position and, since switch 57 has been moved to its closed position upon the ejector frame reaching its jettisoning elevation, the energizing circuit for rammer extend solenoid 58 will be completed and the latter will actuate control valve 59 (Fig. 5) in the ejector mechanism hydraulic system 52 to admit pressure fluid to the rammer cylinders whereby to extend the ram heads 26 into the rocket guide tubes and eject the dud therefrom. Upon the rocket clearing the tube, switch 47 will move to open position, thereby de-energizing solenoid 43 allowing spring means (not shown) to move contactor 45 to its left-hand position and thus shifting mount train control back to the forward position director 37. The mount will thus begin to train toward the forward position. Simultaneously the energizing circuits for the ejector frame elevating solenoid 50 and rammer extend solenoid 58 are opened at switch 60, and the energizing circuit for the rammer retract solenoid 61 is completed by the closing of switches 62. Upon the complete retraction of the rammer heads 26 from the tubes, switch 63 will be moved to closed position, thereby completing the energizing circuit for tube elevating solenoid 64, whereupon the tubes are, by means of a control valve in the launcher hydraulic system, again elevated into registry with the dummy gun (still at the 5° misfire elevation). The tube assembly, upon reaching said position of registry, will move switch 65 to its closed position, thereby completing the energizing circuit for ejector frame retract solenoid 66, the latter shifting control valve 51 (Fig. 5) to admit pressure fluid to the ejector frame elevating and depressing cylinder 29 whereupon the frame is returned to its stowed position. As the mount trains to the forward position, switch 46 is again opened and the mount will stop. Switch 32 may then be manually or automatically shifted to the automatic position whereupon the mount train power drive control will be reshifted to the fire control computer director (train) 36 and the elevation power drive reshifted to the fire control computer director (elevation) 39 by movement of contactor bar 44 to the right. The automatic firing cycle is now resumed. From the above-description it will be apparent that the mount, when training from a target position in area A (Fig. 9) to jettisoning position and back to target position, does not move through the shortest arc, but rather always trains first to the forward position and then to the jettisoning position. Thus at no time will the mount attempt to train through positive train stops S (Fig. 9).

Should the launcher, at the time of misfire, be within train area B (Fig. 9) the control circuit will operate as set forth above except that, since the launcher is in train area B, switch 46 will be in its closed position, solenoid 43 energized, and contactor 45 in its right-hand position. Therefore, upon the movement of misfire switch 32 to the "eject" position, launcher train control will be shifted directly to the fixed position director 38. Thus, the launcher will train directly to the fixed or jettisoning position J and jettisoning cycle will commence in the manner heretofore described. Upon the completion of the ejecting operation, launcher train control is shifted, as before, to the forward position director, inasmuch as switch 47 will be in its open position since the tubes are empty and solenoid 43 de-energized, and the launcher will train to the forward position and stop. Misfire switch 32 may, as previously described, now be operated to the automatic position whereupon the computer director causes the launcher to train back to target position in train area B and commence its firing cycle.

The above-described control circuit is provided with two interlocks 67 and 68 (Fig. 6). Interlock 67, actuated by solenoid 69 in series with suitable switches 70 and 71 prevents the movement of misfire switch 32 to the "eject" position from the automatic position unless switches 70 and 71 are both in their closed position by having either one or both guide tubes loaded and having the launcher rocket loading hoist (not shown) in its retracted position whereby to energize interlock solenoid 69. Interlock 68 actuated by solenoid 72 in series with switches 73 and 74, prevents movement of switch 32 to its automatic position from the "eject" position unless said switches are caused to be in a closed position by having the ejector frame in its stowed position and having the mount trained out of area B whereby to have switch 73 in its closed position. The conductors in the above-described switching arrangement of Fig. 6 have been illustrated, for convenience, as single lines, but in actual practice each director will include a plurality of conductors which must be connected by means of a plurality of contacts to the respective power drives.

It will be apparent from the above description that there is provided a novel dud jettisoning device, for use with a rocket launcher, which is normally retained in a stowed position on the launcher mount, which trains with the mount, and which is completely automatic in its operation, the initiation of the ejecting cycle and the recommencement of the firing cycle after the completion of the ejecting cycle being controlled either manually or automatically. It will further be seen that the present invention provides the control circuit for effecting an automatic jettisoning cycle and for assuring that the launcher will not, in moving from a target position to the jettisoning position or vice versa, attempt to train through the positive train stops.

Obviously many modifications and variations of the present invention are possible in the light of the above teachings. It is therefore to be understood that within the scope of the appended claims the invention may be practiced otherwise than as specifically described.

What is claimed is:

1. A dud jettisoning device for use with a missile launcher including a trainable mount pivotally supporting at least one missile launching tube movable in elevation from an instantaneous firing position to a vertical loading position, comprising a dud jettisoning mechanism secured to said mount for movement in train with said mount and comprising fixed bearing means for pivotally connecting one end of said jettisoning mechanism to said mount, extensible dud ejecting means, means for tilting said mechanism in elevation about said fixed bearing means from a depressed horizontal stowed position to an elevated and inclined dud jettisoning position, said mechanism including stop means for intercepting the movement of the tube to its vertical loading position whereby said tube and said ejecting means may be held in inclined alignment to permit the latter to be extended into the launching tube to eject a dud therefrom.

2. In combination, a missile launcher including a trainable mount pivotally supporting at least one missile launching tube movable in elevation from an instantaneous firing position to a vertical loading position and a cantilevered dud jettisoning mechanism secured to the mount for movement in train with the mount and comprising fixed bearing means for pivotally connecting one end of said jettisoning mechanism to said mount, extensible dud ejecting means, means for tilting said mechanism in elevation about said fixed bearing means from an initial depressed horizontal stowed position to an elevated and inclined dud jettisoning position and for returning said mechanism to said initial horizontal stowed position, said mechanism including stop means for intercepting the movement of the tube to its vertical loading position whereby said tube and said ejecting means may be maintained in inclined alignment to permit the latter to be extended into the launching tube to eject a dud therefrom, and hydroelectrical control means for extending said extensible dud ejecting means to eject a dud when said tube and ejecting means are in said inclined alignment and for retracting said extensible means after a dud is ejected from said tube.

3. In combination with a missile launcher including a trainable mount pivotally supporting at least one missile launching tube movable in elevation from an instantaneous firing position to a vertical loading position, a dud jettisoning mechanism pivotally secured at one end thereof to said mount and comprising extensible dud ejecting means, said mechanism being tiltable in elevation from a depressed horizontal stowed position to an elevated inclined dud jettisoning position and including stop means for intercepting the launching tube during its movement from a horizontal to a vertical position whereby said tube and said ejecting means may be held in alignment to permit the latter to be extended after a misfire to eject the dud missile, hydroelectrical control means for automatically and sequentially elevating said mechanism from an initial stowed position to said jettisoning position in engagement with said stop means, additional hydroelectrical control means for moving said extensible means into said tube to eject a dud therefrom and for retracting said extensible means when a dud is ejected from said tube, and automatically controlled actuating means connected to said tube for depressing the tube to firing position, said hydroelectrical control means being operable to cause depressing of the mechanism to its stowed position.

4. A dud jettisoning device for use with a missile launcher including a trainable mount pivotally supporting at least one missile launching tube movable in elevation from an instantaneous firing position to a vertical loading position, the combination of a dud jettisoning mechanism secured to said mount for movement in train with the mount and including fixed bearing means for pivotally connecting one end of said mechanism to said mount, first control means, actuating means connected to said mount and mechanism and operable by said first control means for tilting said mechanism in elevation about said fixed bearing means from an initial depressed horizontal stowed position to an elevated and inclined dud ejection position, said actuating means being operable by said first control means to return said mechanism to said initial position, ejecting means included in said mechanism and movable from an initial position to a dud ejecting position, second control means, second actuating means connected to said ejecting means and operable by said second control means for moving said ejecting means from said initial position to said dud ejecting position thereby to eject a dud from the tube, and stop means on said mechanism engagble by the tube as the tube moves to its vertical loading position for maintaining the tube and ejecting means in inclined alignment with respect to each other to allow ejection of a dud from said tube as the ejecting means is moved from said initial position to said dud ejecting position.

5. In combination, a missile launcher including a trainable mount pivotally supporting at least one missile launching tube movable in elevation from an instantaneous firing position to a vertical loading position and a cantilevered dud jettisoning mechanism secured to the mount for movement in train with the mount and comprising a bracket secured to the mount and having one end thereof pivoted to said mechanism, first hydroelectrical control means, actuating means connected to the mount and mechanism and operable by said first control means for tilting said mechanism about said pivot from an initial depressed horizontal stowed position to an elevated and inclined dud jettisoning position, said actuating means being operable by said first control means for returning said mechanism from said jettisoning position to said initial horizontal stowed position, second hydroelectrical control means, dud ejecting means connected to and movable by said second control means from an initial position to a dud jettisoning position for ejecting a dud from the tube, said dud ejecting means being operable by said second control means for returning the dud ejecting means from said dud jettisoning position to an initial position, and stop means carried by said mechanism and engageable by complementary stop means on said tube for maintaining said tube and dud ejecting means in inclined alignment with respect to each other during a dud ejecting operation.

6. In combination, a missile launcher including a trainable mount pivotally supporting at least one missile launching tube movable in elevation from an instantaneous firing position to a vertical loading position and a cantilevered dud jettisoning mechanism secured to the mount for movement in train with the mount and comprising a fixed bearing means for pivotally connecting one end of said mechanism to said mount, extensible dud ejecting means, control means including a pair of electroresponsive devices for tilting said mechanism in elevation about said fixed bearing means from an initial depressed horizontal stowed position to an elevated and inclined dud jettisoning position in response to the energization of one of said pair of electroresponsive devices and for returning the mechanism from said dud jettisoning position to said initial position in response to the energization of the other one of said pair of electroresponsive devices, said mechanism including stop means for intercepting the movement of the tube to the vertical loading position such that said tube and said ejecting means are maintained in inclined alignment with respect to each other to allow the ejection means to be extended into the launching tube to eject a dud therefrom, and hydroelectrical control means for extending said extensible means to eject a dud from the tube and for retracting said extensible means after ejection of the dud from the tube.

7. In combination, a missile launcher including a trainable mount pivotally supporting at least one missile launching tube movable in elevation from an instantaneous firing position to a vertical loading position and a cantilevered dud jettisoning mechanism secured to the mount for movement in train with the mount and comprising fixed bearing means for pivotally connecting one end of said mechanism to said mount, dud ejecting means including an element movable from an initial position to a dud ejecting position, hydroelectrical means for tilting said mechanism in elevation about said fixed bearing from an initial depressed horizontal stowed position to an elevated and inclined dud jettisoning position, said hydroelectrical means including additional means for returning said mechanism from said dud jettisoning position to said initial position, stop means carried by said mechanism and cooperating with complementary means carried by the tube for intercepting the movement of the tube to its vertical loading position such that the tube and said ejecting means are maintained in inclined alignment to allow the movable element to be moved into the launching tube to eject a dud therefrom, control means including a pair of electroresponsive devices operatively connected to said ejecting means and operated in response to energization of one of said pair of electroresponsive devices for moving said movable element an amount sufficently to eject a dud from said tube when the tube and ejecting means are in said inclined alignment, and for retracting said movable element from said dud ejecting position to said initial position in response to the energization of the other one of said pair of electroresponsive devices.

References Cited in the file of this patent
UNITED STATES PATENTS

| | | |
|---|---|---|
| 457,293 | Spiller | Aug. 4, 1891 |
| 1,304,583 | McClain | May 27, 1919 |
| 2,112,853 | Lucht et al. | Apr. 5, 1938 |
| 2,410,116 | Vickers | Oct. 29, 1946 |
| 2,426,610 | Hopkins | Sept. 2, 1947 |
| 2,464,920 | Carter | Mar. 22, 1949 |
| 2,485,715 | Eastman | Oct. 25, 1949 |
| 2,745,317 | Stanton et al. | May 15, 1956 |

FOREIGN PATENTS

| | | |
|---|---|---|
| 411,576 | Italy | Jan. 18, 1945 |
| 970,202 | France | June 14, 1950 |
| 692,140 | Great Britain | May 27, 1953 |